(12) United States Patent
Bitterman et al.

(10) Patent No.: US 10,801,684 B2
(45) Date of Patent: Oct. 13, 2020

(54) KINEMATICALLY LINKED OPTICAL COMPONENTS FOR LIGHT REDIRECTION

(71) Applicant: X Development LLC, Mountain View, CA (US)

(72) Inventors: Matthew Bitterman, San Francisco, CA (US); Eli Reekmans, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 346 days.

(21) Appl. No.: 15/853,919

(22) Filed: Dec. 25, 2017

(65) Prior Publication Data

US 2018/0119911 A1 May 3, 2018

Related U.S. Application Data

(63) Continuation of application No. 14/831,259, filed on Aug. 20, 2015, now Pat. No. 9,857,040.

(51) Int. Cl.
*G02B 19/00* (2006.01)
*F21S 11/00* (2006.01)
*G02B 26/08* (2006.01)
*H02S 40/22* (2014.01)

(52) U.S. Cl.
CPC ............ *F21S 11/005* (2013.01); *F21S 11/00* (2013.01); *F21S 11/007* (2013.01); *G02B 19/0019* (2013.01); *G02B 19/0042* (2013.01); *G02B 26/0816* (2013.01); *H02S 40/22* (2014.12); *Y02E 10/52* (2013.01)

(58) Field of Classification Search
CPC . H02S 40/22; G02B 26/0816; G02B 19/0019; G02B 19/0042; Y02E 10/52; F21S 11/005; F21S 11/00; F21S 11/007
USPC ........................................................ 359/850
See application file for complete search history.

(56) References Cited

U.S. PATENT DOCUMENTS

| 4,050,777 A | 9/1977 | Peters |
| 4,198,953 A | 4/1980 | Power |
| 4,349,245 A | 9/1982 | Kliman |
| 4,386,848 A | 6/1983 | Clendenin |

(Continued)

FOREIGN PATENT DOCUMENTS

WO 2000075708 A1 12/2000

*Primary Examiner* — William R Alexander
(74) *Attorney, Agent, or Firm* — McDonnell Boehnen Hulbert & Berghoff LLP

(57) ABSTRACT

Embodiments described herein may relate to a system comprising a plurality of optical elements, comprising at least a first optical element and one or more secondary optical elements, a heliostat comprising the first optical element, where the heliostat is operable to move the first optical element to continuously reflect light from a non-stationary light source in a beam towards a first of the secondary optical elements, and where the secondary optical elements are arranged to re-direct the reflected beam of light towards an illumination target. The system further includes a controller configured to receive position data indicative of the position of the non-stationary light source over time, and in response to the position data, control at least the heliostat to continuously direct the beam of light towards the first of the secondary optical elements, such that the beam of light is continuously re-directed towards the illumination target.

20 Claims, 8 Drawing Sheets

(56) References Cited

U.S. PATENT DOCUMENTS

| | | |
|---|---|---|
| 4,389,085 A | 6/1983 | Mori |
| 4,720,170 A | 1/1988 | Learn, Jr. |
| 5,023,709 A | 6/1991 | Kita |
| 6,073,500 A | 6/2000 | Jorgensen |
| 6,079,862 A | 6/2000 | Kawashima |
| 7,190,126 B1 * | 3/2007 | Paton .................... H05B 47/19 |
| | | 315/308 |
| 7,579,592 B2 | 8/2009 | Kaushal |
| 7,920,276 B2 | 4/2011 | Braiman |
| 8,054,179 B2 | 11/2011 | Mayhew |
| 8,132,938 B2 | 3/2012 | Granqvist |
| 8,408,199 B1 | 4/2013 | Klinkman |
| 8,614,747 B2 | 12/2013 | Alt |
| 8,702,255 B2 | 4/2014 | Baxter |
| 9,626,562 B2 | 4/2017 | Hanna |
| 9,629,220 B2 | 4/2017 | Panopoulos |
| 9,739,506 B2 * | 8/2017 | Jaakkola ................. F24S 50/20 |
| 2004/0150837 A1 | 8/2004 | Sugiyama |
| 2004/0165290 A1 | 8/2004 | Muscat |
| 2010/0139644 A1 | 6/2010 | Schwarzbach |
| 2010/0200753 A1 | 8/2010 | Westaway |
| 2010/0300510 A1 | 12/2010 | Goldman |
| 2010/0328092 A1 * | 12/2010 | Kondo ................... G06Q 10/10 |
| | | 345/204 |
| 2011/0030672 A1 | 2/2011 | Olsson |
| 2011/0126883 A1 | 6/2011 | Goldman |
| 2012/0074852 A1 * | 3/2012 | Delnoij .................. H05B 47/11 |
| | | 315/158 |
| 2012/0125404 A1 | 5/2012 | Dos Santos Teixeira Ramos |
| 2012/0268930 A1 | 10/2012 | Lu |
| 2013/0002142 A1 | 1/2013 | Sawada |
| 2013/0049695 A1 * | 2/2013 | Baba ........................ H02J 3/12 |
| | | 320/128 |
| 2013/0200207 A1 | 8/2013 | Pongratz |
| 2013/0269680 A1 | 10/2013 | Womack |
| 2013/0293722 A1 | 11/2013 | Chen |
| 2014/0094985 A1 * | 4/2014 | Hibiya .................. H01M 10/44 |
| | | 700/297 |
| 2014/0268680 A1 | 9/2014 | Fuller |
| 2014/0305490 A1 | 10/2014 | Jaakkola |
| 2015/0070769 A1 | 3/2015 | Maxey |
| 2015/0070776 A1 | 3/2015 | Maxey |
| 2015/0084523 A1 * | 3/2015 | Nishigaki ............ H05B 47/105 |
| | | 315/154 |
| 2015/0100172 A1 * | 4/2015 | Forbes, Jr. ................ H02J 3/14 |
| | | 700/295 |
| 2015/0230306 A1 * | 8/2015 | Moellenberg .......... H05B 47/00 |
| | | 307/24 |
| 2016/0333638 A1 * | 11/2016 | Cascia ..................... E06B 9/38 |
| 2019/0158011 A1 * | 5/2019 | West ..................... G06N 20/20 |

\* cited by examiner

KINEMATICALLY LINKED OPTICAL COMPONENTS FOR LIGHT REDIRECTION

CROSS REFERENCE TO RELATED APPLICATION

This application claims priority to U.S. patent application Ser. No. 14/831,259 filed on Aug. 20, 2015 and entitled "Kinematically Linked Optical Components for Light Redirection," which is incorporated herein by reference as if fully set forth in this description.

BACKGROUND

Unless otherwise indicated herein, the materials described in this section are not prior art to the claims in this application and are not admitted to be prior art by inclusion in this section.

Many indoor spaces, particularly in urban areas, receive very limited sunlight due sunlight being impeded by other buildings or structures. These spaces may typically be illuminated using artificial light which may not be as pleasant as natural sunlight. Furthermore, artificial lighting is costly, especially when trying to replicate the intensity of sunlight; e.g., as might be done for purposes such as growing plants, for instance. It is also challenging and/or expensive to replicate or simulate other benefits of sunlight, such as providing humans with vitamin D, heating interior spaces, and so on, with artificial light and/or by other means.

SUMMARY

Because of the challenges of replicating sunlight with artificial lighting, solutions for redirecting sunlight to desired interior spaces are desirable. Some example systems disclosed herein use a series of optical elements, including a heliostat that tracks the movement of the sun, to redirect sunlight to desired areas, such as interior spaces that receive little or no sunlight. Such systems may be installed quickly and at a relatively low cost. Further, such systems may use a series of optical components to redirect sunlight through, e.g., a window or another pre-existing opening to an interior space. As such, some example systems may allow for controllable natural lighting in interior spaces, without the need to alter the structure surrounding the space (e.g., by cutting a hole in the roof, as is typically required for a skylight or solar tube).

In one aspect, a kinematically linked system may include a plurality of optical elements, comprising at least a first optical element and one or more secondary optical elements, a heliostat comprising the first optical element, where the heliostat is operable to move the first optical element to continuously reflect light from a non-stationary light source in a beam towards a first of the secondary optical elements, where the secondary optical elements are arranged to redirect the reflected beam of light towards an illumination target. The system further includes a controller configured to receive position data indicative of the position of the non-stationary light source over time, and in response to the position data, control at least the heliostat to continuously direct the beam of light towards the first of the secondary optical elements, such that the beam of light is continuously redirected towards the illumination target.

In another aspect, a kinematically linked system may include a plurality of optical elements configured to direct light to a moveable illumination target, where the one or more optical elements comprise one or more first optical elements and a final optical element, where the one or more first optical elements are arranged to receive light from a light source and reflect a beam of light along a path to the final optical element, where the final optical element is moveable to continuously re-direct the beam of light towards the moveable illumination target, and a controller configured to receive position data indicative of movement of the illumination target, and based at least in part on the position data, move at least the final optical element to continuously re-direct the beam of light to the moveable illumination target during a movement of the moveable illumination target.

DETAILED DESCRIPTION

Figure 1:
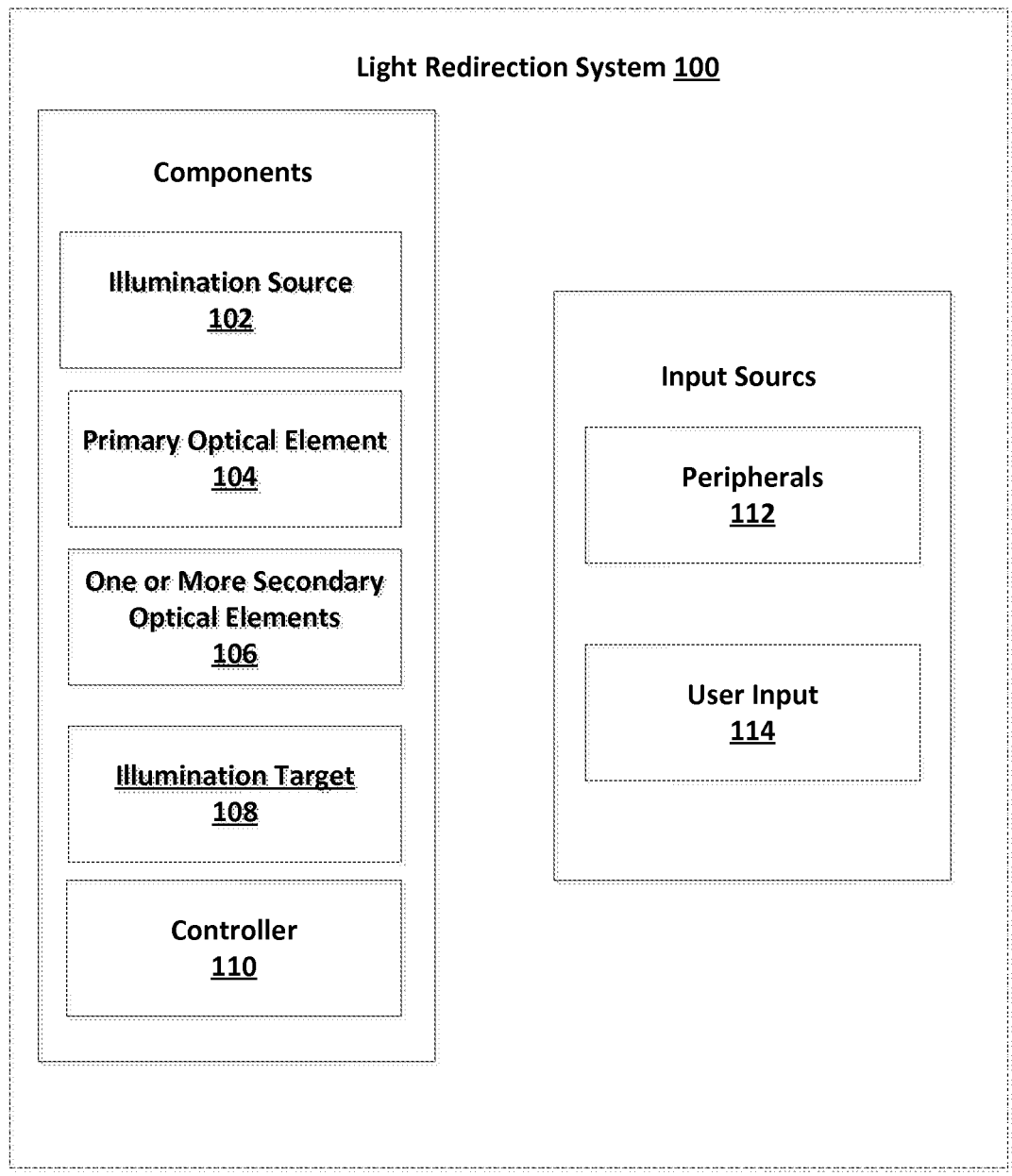
FIG. 1 is a simplified block diagram illustrating a light redirection system, according to an exemplary embodiment.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Furthermore, the term "heliostat" as used herein should be understood broadly as an optical element configured to track and reflect light from any source of illumination, and should not be limited to tracking and reflecting light from the sun. Although generally a heliostat is an optical element configured to track and reflect light from the sunlight, the optical element described herein as a heliostat may track and reflect light from any stationary and non-stationary source of light including but not limited to, the sun, the moon, ambient light sources, diffused light, lasers, and light emitting diodes (LEDs).

I. Overview

Many areas in modern cities may receive limited direct sunlight, due to their proximity to buildings and/or their geographical location. Such areas may include both outdoor and indoor spaces in a city. For example, rooms within buildings may receive limited sunlight due to an adjacent taller building blocking the sunlight from reaching the room. The room may also be facing the west, and thus does not receive sunlight as the sun rises from the east. Other areas, for various other reasons, may receive sunlight only for a limited time of the day.

Artificial lighting is a common solution for illuminating areas that receive little or no natural lighting. There are a number of drawbacks to the use of artificial lighting, as compared to natural sunlight. For example, some may not find artificial lighting as pleasant as natural light. From a consumer's perspective, sunlight is essentially free, while artificial lighting is costly. Electric bills for artificial lighting can be high, especially when trying to replicate the intensity of sunlight; e.g., as might be done for purposes such as growing plants. Artificial lighting technology that actually replicates and/or simulates the benefits and/or strength of sunlight, such as providing humans with vitamin D, heating interior spaces, and so on, with artificial light, can also be very expensive.

Some solutions to this problem utilize sunlight to illuminate unlit areas by installing apertures for sunlight to pass through. However, these solutions, such as skylights or solar tubes, may be impractical for certain indoor areas, and installation can prohibitively expensive (e.g., requiring holes be cut in roofs and walls, and perhaps altering building support structures). Further, such solutions are not a practical solution for shaded outdoor areas.

Accordingly, example embodiments may kinematically link optical components to dynamically redirect a beam of light to a desired area, such as an interior room that receives little to no natural light through its window(s). In other embodiments, kinematically linked optical components may be used to redirect sunlight to a desired area to supplement the sunlight that the area may already receive. Further, example embodiments may help to provide such benefits at a relatively affordable price, and/or with considerably less installation effort, as compared to existing solutions such as skylights and solar tubes.

For instance, an example system may include: (a) a heliostat configured to track a non-stationary light source, and to reflect a beam of light to one or more secondary optical elements, (b) the one or more secondary optical elements are configured to redirect the beam of light to an illumination target, and (c) a controller configured to receive position data indicative of the position of the non-stationary light source over time, and to control at least the heliostat to continuously direct the beam of light towards the first of the secondary optical elements, such that the beam of light is continuously redirected towards the illumination target.

In such a system, the non-stationary light source that the heliostat tracks may be a source of natural light that moves over time, such as sun or moon. The secondary optical elements that may be used to redirect the beam of light from the light source may take on various forms. For example, at least one of the optical elements may be a mirror; which may be a reflecting mirror, a cool mirror, or a dichroic mirror. Another example of a secondary optical element used is a prism, which may be used to create visually appealing patterns of light in the illumination target.

The illumination target may be determined by a user or intelligently determined by a controller using sensor inputs. Thus, in order to redirect light to the determined illumination target, one or more of the optical elements may be moveable, in addition to the heliostat. For example, a controller could consider various factors and move one or more of the optical components to change the path of the reflected light, so as to intelligently switch between a number of different targets. As specific examples, a controller could move one or more of the optical components to switch between illuminating different rooms as the illumination target, to switch between different areas in the same room as the illumination target, and/or to switch between an interior room and a solar cell (which might put electricity back into the grid) as the illumination target, among other possibilities.

In one implementation, a system is used to kinematically link optical components to redirect sunlight to a specified illumination target. In this system, a heliostat is used to track the movement of the sun and to reflect the sunlight to the secondary optical elements that in turn redirect the beam of light to a target area inside a room of a building. In a further aspect, the controller may receive an input from a user defining the illumination target in the room. Such functionality may allow for various useful features, such as control of an example system to direct sunlight to desired areas in a room via an application on a mobile phone or tablet.

In a further aspect of some embodiments, the system controller may utilize peripheral information (e.g., from motion sensors, cameras, etc.) to detect whether a user is in the room. Then, if a user is detected in the room, the controller may responsively adjust one or more of the optical elements to redirect the sunlight into the room. And, if the user is not in the room, the controller may responsively adjust one or more of the optical elements to redirect the sunlight to a second target area, which serves a different purpose. For instance, the controller may adjust the system of optical elements to direct sunlight to a solar cell. The solar cell may be configured to "put back" electricity into the grid (such that the user might be paid for their contribution) and/or to charges batteries that power the user's devices or home electronics (e.g., such as DC power source for the user's home). In another example, the controller may use peripherals (e.g. sensors, smart temperature systems, etc.) to determine whether the temperature in a room, into which the optical elements may be redirecting sunlight, exceeds a predetermined temperature. If it does, the controller may adjust optical elements to redirect the sunlight onto the second target area; a solar cell, for example.

In another implementation, the optical element of the heliostat may be a parabolic solar collector, which focuses sunlight that is received over a large area into a small beam. The small beam is then directed to the secondary optical elements which then redirect the beam to the illumination target.

In yet another implementation, a system is used to kinematically link optical components to redirect light to illuminate a moveable illumination target. The controller may be configured to adjust the optical elements to redirect light to illuminate the moveable illumination target. In one example, the system includes a robotic system configured to track the position of the moveable illumination target. The robotic system then changes its position based on the position of the illumination target area. In this example, a light is thus used to direct the movement of a robotic system.

II. Illustrative Light Redirection Systems

In accordance with an example embodiment, a light redirection system may include various components, including an illumination source, a primary optical element, one or more secondary optical elements, and a controller, collectively configured to kinematically link optical components to redirect light to an illumination target.

FIG. 1 is a simplified block diagram illustrating the components of a light redirection system, according to an exemplary embodiment. In particular, FIG. 1 shows light redirection system 100 that may redirect light emanating from illumination source 102 to illumination target 108 by kinematically linking primary optical element 104 and one or more secondary optical elements 106. Components 102-108 of system 100 may be located in either an outdoor space or an indoor space. In certain embodiments, all of the components of system 100 may be located in either an outdoor space or an indoor space. In other embodiments, certain components of system 100 may be located in an outdoor space, while other components are located in an indoor space. In an example, illumination source 102, primary optical element 104, and one or more secondary optical elements 106 may be located in an outdoor space while illumination target 108 is located in an indoor space. In other examples, illumination source 102, primary optical element 104, and a number of secondary optical elements 106 may be located in an outdoor space, while the rest of secondary elements 106 and illumination target 108 may be located in an indoor space. Other arrangements of components 102-108 of system 100 may also be possible.

Furthermore, system 100 may also include controller 110. Controller 110 may control one or more components of components 102-108 of system 100. Controller 110 may also be configured to receive input from input sources 112 and 114. Specifically, controller 110 may be configured to receive input, in the form of data, from peripherals 112, which may be sensors for instance. In other examples, controller 110 may receive a user input 114. For example, controller 110 may receive an input from a user via a mobile phone application that may be connected to system 100.

Accordingly, system 100 may include one or more communication systems to communicate with devices (peripherals) and/or networks that may provide data and/or inputs. As such, system 100 may be configured for communication with remote devices. For example, controller 110 may communicate with a mobile device, a tablet computer, a laptop computer, a server, a GPS satellite, or any network-connected device. Further, the communications systems may include one or more wireless interfaces and/or one or more wireline interfaces, which allow controller 110 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or a similar interface to communicate via a wire, a twisted pair of wires, a coaxial cable, an optical link, a fiber-optic link, or other physical connection to a wireline network.

Further, in embodiments of system 100, illumination source 102 may be a stationary illumination source while in other embodiments it may be a non-stationary illumination source that moves over time. Examples of non-stationary illumination sources include, but are not limited to, sources of natural light such as the sun. Examples of stationary illumination sources include, but are not limited to, artificial sources of light such as high intensity Light-Emitting Diodes (LEDs). In example embodiments, system 100 may be configured to redirect light from both non-stationary and stationary sources at different times. As an example, system 100 may be configured to track the sun and redirect its light during the day, and then track the moon and redirect its light during the night. The same system may also be configured to redirect light from a high intensity LED (stationary source) in instances where natural light is obstructed from reaching the system. In a further example, system 100 may be configured to track the sun and redirect its light during sunny days, and on days when it is cloudy, system 100 may be configured to redirect light from a high intensity LED.

To utilize light emanating from illumination source 102, primary optical element 104 is located in an area where it may be illuminated by illumination source 102. Primary optical element 104 may be configured to continually reflect a substantial amount of light from illumination source 102 to secondary optical elements 106. In example embodiments, primary optical element 104 may be a heliostat comprising an optical element. In this implementation, the heliostat may be configured to track the movement of illumination source 102 over time, and to continuously reflect light from illumination source 102 to secondary optical elements 106. Primary optical element 104 in the form of a heliostat may be one of several different structures. For example, the heliostat may be a heliostat comprising a planar mirror as the optical element. In other examples, the optical element of the heliostat may be a circular, parabolic, or any other shape of mirror. Yet in other examples, the optical element of the heliostat may include a number of individual mirrors arranged in an array that may be configured to continually reflect light from illumination source 102.

In exemplary embodiments, primary optical element 104, in the form of a heliostat, may be mounted on an altazimuth mount configured to rotate the optical element about two mutually perpendicular axes. Rotation about the first axis, the vertical axis, varies the azimuth angle of the heliostat. Rotation about the second axis, the horizontal axis, varies the altitude angle of the heliostat. Adjusting the angles of the altazimuth mount may determine not only the amount of light incident on the primary optical element, but also may determine the reflection angle of incident light.

In some embodiments, controller 110 may control the adjustment of the altazimuth mount's angles. In an example, controller 110 may receive data, such as GPS coordinates detailing the position of optical elements of system 100, from network-connected devices. Controller 110 may also receive positioning data, which is indicative of the positioning of non-stationary illumination sources. Controller 110 may use the data it receives to continually track a non-stationary illumination source. Controller 110 may then responsively adjust the angles of the altazimuth mount so that heliostat 104 may reflect light emanating from the non-stationary illumination source.

Primary optical element 104 may reflect incident light, emanating from illumination source 102, towards one or more secondary optical elements 106. Exemplary embodiments may consist of one secondary optical element configured to redirect the beam of light, which is reflected from primary optical element 104, to illumination target 108. Other embodiments may consist of a number of secondary optical elements arranged in a series. In this implementation, light reflected from the primary optical element is redirected, via the secondary optical elements of the series, towards the illumination target. For example, secondary optical elements 106 may consist of three optical elements arranged in a series. The first secondary optical element may be configured to redirect light, which is reflected from primary optical element 104, towards the second secondary optical element, which in turn may redirect the light towards the third secondary optical element (which in this case is also the final optical element in the system). As such, the third optical element may be configured to redirect the light towards illumination target 108.

Further, one or more secondary optical elements 106 may be one of many possible optical elements. Examples of possible secondary optical elements include, but are not limited to, reflecting mirrors, dichroic mirrors, cool mirrors, concentrators, and prisms. Other optical elements may be used as secondary optical elements as well. Within examples, mirrors may be used to redirect light in an exemplary system. Reflecting mirrors may come in a variety of shapes and sizes, i.e. circular, planar, parabolic, and so on. Dichroic mirrors may have significantly different reflection properties at different wavelengths. For example, dichroic mirrors may be configured to reflect certain wavelengths while absorbing/transmitting other wavelengths of light. Using this feature, dichroic mirrors may be configured to reflect a certain color of light from the visible spectrum. In other examples, concentrators may be used to focus light into a beam that is directed towards a focal point. Examples of concentrators include concave mirrors and fresnel lenses. In yet other examples, prisms may be used as secondary optical elements to disperse light. Additionally, in embodiments with a number of secondary optical elements, one or more elements may be the same, while other elements may be different. For example, a number of secondary optical elements may all be reflecting mirrors except for the last secondary optical element (also the final optical element of the system), which may be a prism for example.

Furthermore, the final optical element of a system, which is one of the one or more secondary optical elements, may be moveable. In example embodiments, the final optical element may be mounted on a moveable arm. Further, the moveable arm may be automated and governed by controller 110 of system 100. Thus, controller 110 may control the orientation of the final optical element of system 100. In some embodiments, controller 110 may adjust the orientation of the final optical element in order to change illumination target 108. For example, controller 110 may receive an input directing controller 110 to change illumination target 108. In response, controller 110 may adjust the orientation of the final optical element in order to illuminate updated illumination target 108.

The final optical element of a system 100 may be configured to redirect light to illumination target 108. Within examples, illumination target 108 may be an outdoor space or an indoor space that does not receive substantial natural lighting. For instance, illumination target 108 may be inside a room of a building that light is obstructed from reaching. The room may be a room of a residential home, apartment, or a large area in a warehouse. In other embodiments, illumination target 108 may be an outdoor space that does not receive substantial natural lighting due to its geographical location and/or the positioning of other structure in its surroundings. Outdoor spaces may include patios, urban gardens, and parks. Furthermore, within examples, illumination target 108 may intelligently be determined by controller 110. For example, controller 110 may use the data it receives from peripherals and/or network-connected devices to determine illumination target 108. In other examples, system 100 may be controlled by a user, such that a user may define illumination target 108 via an input to controller 110. Accordingly, light redirection system 100 may be unique to a specific user. For example, a user may install system 100 such that the system may redirect light to an area that may only be specified by the user. For instance, the user may install system 100 in the proximity of a building such that light is redirected into an illumination target within the user's space (e.g. apartment, or room within the apartment). In other examples, the user may be a corporation, where system 100 may be configured to redirect light into a warehouse or building of the corporation.

III. Modes of Operation

A light redirection system may be used to kinematically link optical components for a variety of purposes. As such, a light redirection system may have one or more modes of operation, where each mode is configured to redirect light for a specific purpose. For example, a light redirection system may have an illumination mode, where the system may be configured to redirect light to a target for illumination purposes. A light redirection system may also have operation modes configured to redirect light for heating purposes, aesthetic purposes, and/or energy generation purposes. Other modes of operation may be possible as well. In example embodiments, a light redirection system, which may interchangeably be called a kinematically linked system, may be configured to carry out only one mode of operation. In other embodiments, a system may also be configured to carry out several different modes of operation.

As noted above, a light redirection system may have several modes of operation. Specific examples will now be discussed with regards to light redirection systems operating in different modes, such as for the various systems discussed above. Note that these examples are provided for exemplary purposes only and are not meant to be limiting. Furthermore, exemplary systems illustrated in FIGS. 2A, 2B, and 2C may be used to explain several different modes of operation.

A. Illumination Mode

Figure 2A:
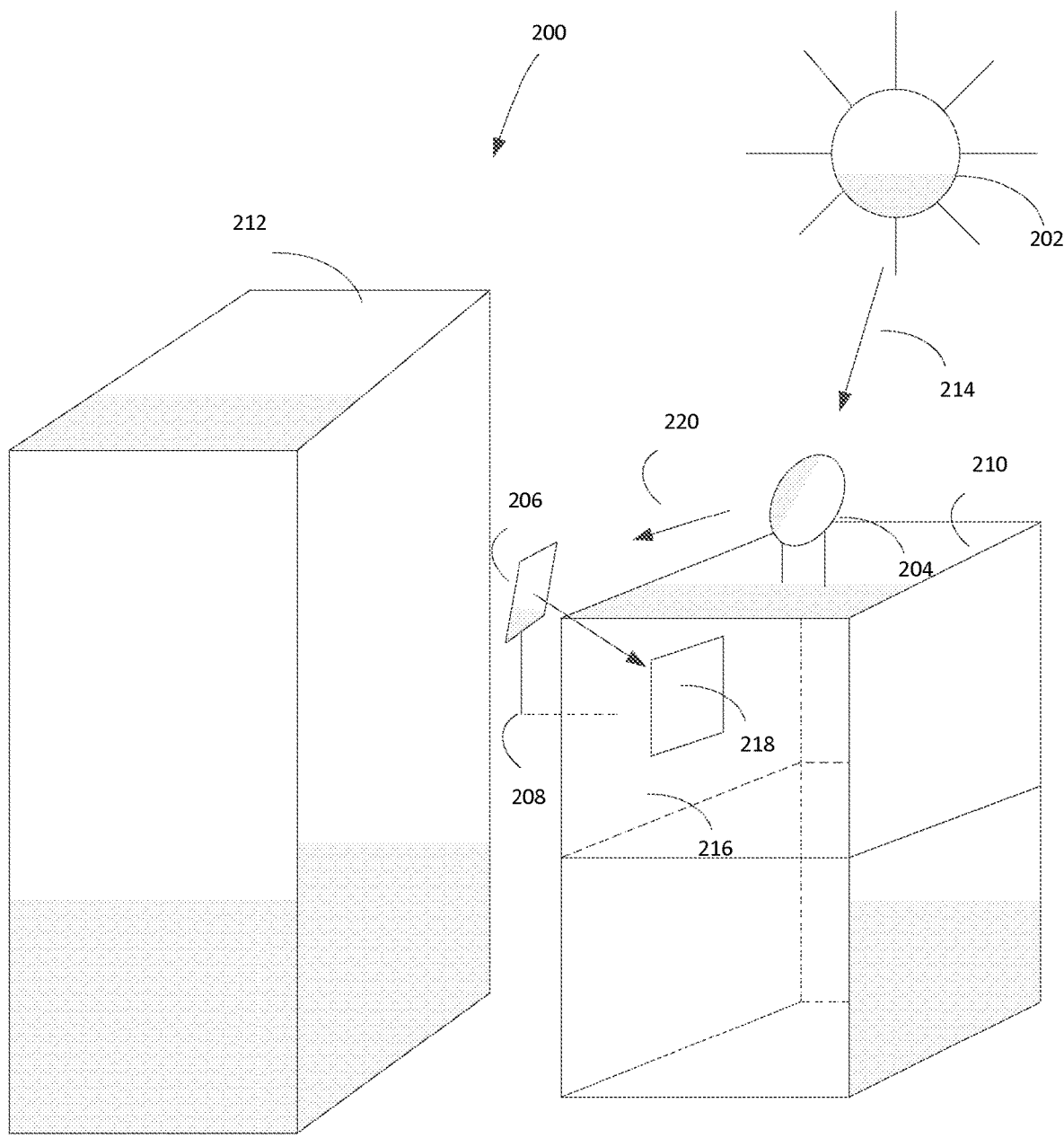
FIGS. 2A, 2B, and 2C are non-stationary light redirection systems, according to an exemplary embodiment.

In an exemplary mode of operation, a light redirection system may be configured to redirect light to an illumination target for illumination and aesthetic purposes. FIG. 2A illustrates a light redirection system, according to an exemplary embodiment. In certain embodiments, system 200 may be operating in illumination mode. Specifically, system 200 may include non-stationary illumination source 202, primary optical element 204, and secondary optical element 206. Furthermore, secondary optical element 206 is also the final optical element of system 200. Accordingly, element 206 may be interchangeably referred to as secondary optical element 206 and final optical element 206. As can be seen in FIG. 2A, the positioning of illumination source 202 may be such that room 216 may not be illuminated by the illumination source. However, even if illumination source 202 was in a different position, room 216 may not be illuminated by illumination source 202 as building 212 may impede light 214 from reaching the room through window 218.

In an example embodiment of system 200, the controller of the system (not shown) may receive an input directing the system to operate in illumination mode. The controller may receive the input from a user, via a mobile device for instance. Further, the controller may also receive data from a network, satellite, and/or a network-connected device, detailing at least the GPS coordinates of the optical elements of system 200, the positioning data of non-stationary illumination source 202, and the specified illumination target. In this implementation, non-stationary illumination source 202 may be the sun, primary optical element 204 may be a heliostat comprising a circular mirror, secondary optical element 206 may be a planar mirror mounted on to arm 208 attached to building 210, and the specified illumination target area is room 216.

Based at least on the data it receives, the controller may adjust the orientation of heliostat 204 to continually track the movement of sun 202. The controller may further adjust heliostat 204's alignment in order to ensure that a substantial amount of sunlight 214 is reflected into a beam of light 220. FIG. 2C illustrates an example adjustment of the orientation of heliostat 204. As can be seen in FIG. 2C, the position of non-stationary source of illumination has changed. Accordingly, the controller of system 260 may track the change in the position of source 262 using at least the solar positioning data it has received. In response to the change in position of non-stationary source 262, the controller may adjust the orientation of heliostat 264 in order to continually reflect a substantial amount of light into beam of light 280. As explained above, the controller may adjust the orientation of heliostat 264 by adjusting the angles of the heliostat's altazimuth mount. Graph 282 illustrates the angle adjustment that the controller may make in adjusting the positioning of heliostat 204. As shown in graph 282, heliostat 204 was oriented at an angle of elevation a, as can be seen in FIG. 2A. In response to the change in position of illumination source 262, the controller may adjust the angle of elevation of heliostat 264 to β. Therefore, by adjusting the angles of heliostat 204, system 200 may continually track sun 202, and may continually reflect sunlight 214 into beam of light 220.

Furthermore, heliostat 204 may be orientated such that beam of light 220 is directed towards mirror 206. Mirror 206 may then reflect beam of light 220 through window 218 and into room 216 (the illumination target), thereby illuminating it. Within examples, secondary optical element 206 of system 200 may illuminate room 216 in different manners depending on the choice of optical element. For example, secondary optical element 206 may be a prism, which may be used to disperse light into room 216, thereby creating a visually appealing pattern of light. In other examples, secondary optical element 206 may be a concentrator, which may be configured to focus light into room 216. In yet other examples, secondary optical element 206 may be a dichroic mirror, which may be configured to illuminate room 216 with a certain light color.

Figure 2B:
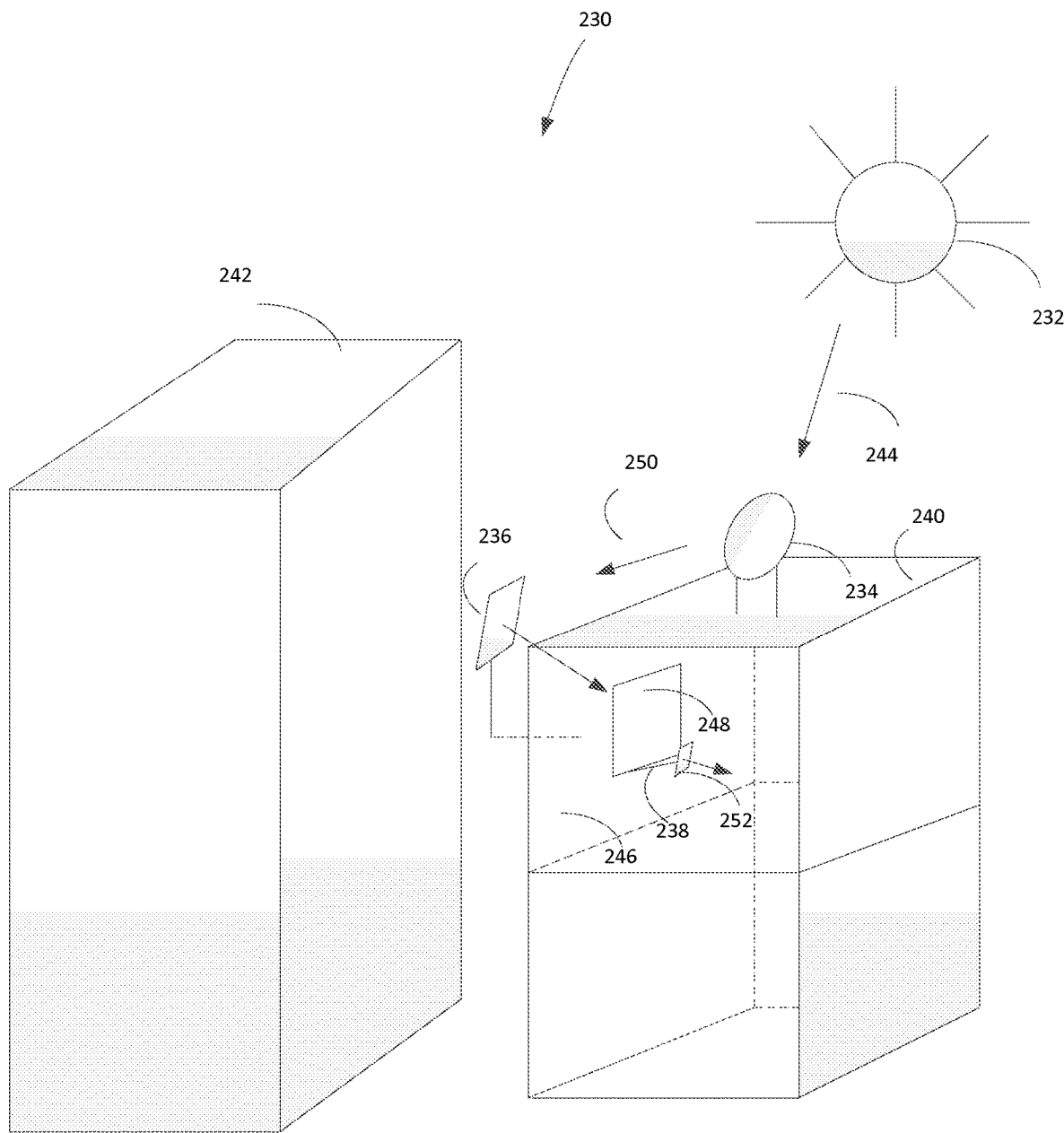
Figure 2C:
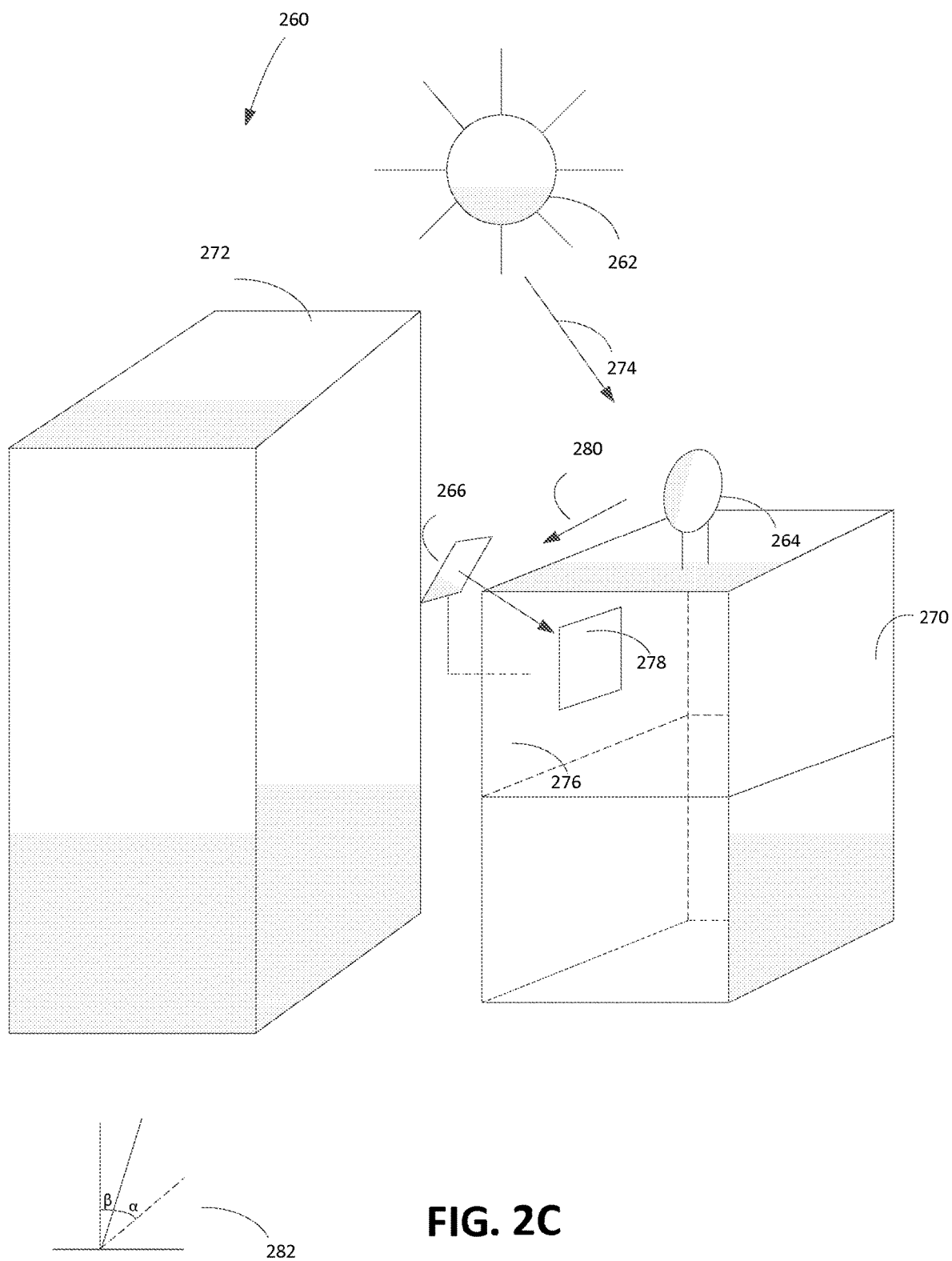

FIG. 2B illustrates a kinematically linked system 230 that may operate in illumination mode, according to exemplary embodiments. Within examples, system 230 may include a number of secondary optical elements, where the last secondary optical element may also be a final optical element of the system. As in exemplary system 200 of FIG. 2A, when system 230 is in illumination mode, it may operate by redirecting light from sun 232 to an illumination target. However, system 230 may include more than one secondary optical element. Specifically, system 230 includes two secondary optical elements, elements 236 and 252, which may be configured to redirect beam of light 250 towards an illumination target. As can be seen in FIG. 2B, beam of light 250 may be redirected from element 236 to element 252, which then may redirect the light to the illumination target. In example embodiments, element 236 and element 252 may be the same type of optical element. For instance, elements 236 and 252 may both be a mirror. In other embodiments, secondary elements 236 and 252 may be different types of optical elements. For instance, element 236 may be a mirror, while element 252 may be a prism. Furthermore, secondary optical element 252, the last optical element of system 230, may also be referred to as final optical element 252.

The final optical element of a system may be attached to an adjustable arm. The arm may also be automated and governed by the controller of the light redirection system. In an example, final optical element 252 illustrated in FIG. 2B, is attached to arm 238, which may be moveable. As such, the controller of system 230 may adjust the orientation of final optical element 252. Changing the orientation of final optical element 252 may consequently change the illumination target of system 230. For example, adjusting the tilt of final optical element 252 may raise or lower the illumination area. Furthermore, adjusting the orientation of final optical element 252 may control the amount of light that is reflected to the illumination target.

In an example embodiment, system 230 may receive an input directing the system to change the illumination target. In response, the controller of system 230 may adjust the orientation of final optical element 252 to redirect light to the specified illumination target. Within examples, controller 230 may receive an input from a user via a mobile device detailing the illumination target. In an example, the illumination target may be a specific area within room 246. For instance, a user input may direct the controller to adjust the final optical element to redirect light to a living area within room 246, where the user may be sitting. Consequently, the controller may adjust arm 238 to redirect light to the area directed by the user's input.

In example embodiments, arm 238 may be governed by the controller of system 230 such that final optical element 252 may have a wide range of possible orientations. Further, the choice of final optical element 252 may determine the manner in which light is redirected to the illumination target. For example, final optical element 252 may be a variable concentrator. The variable concentrator may consist of several different lenses that may focus incident light into different beam sizes. In example embodiments, a user may request system 230 to focus light on to a specific area. For instance, a user may be reading a book while sitting in a living area within room 246. As such, rather than illuminating the entire living area, the user may request a smaller beam that may illuminate the pages of the book that the user is reading.

In other example embodiments, the controller may intelligently determine to operate in illumination mode based on the data it receives from peripherals and/or network-connected devices. The data received by the controller may include information about the status of the room, such as current occupancy, temperature, and so on. In an example, the controller may intelligently determine to operate system 230 in illumination mode based on a time of the day. In other examples, the controller may receive data from a motion sensor indicating that a user has entered into room 246. In response, the controller may determine to operate system 230 in illumination mode.

Furthermore, the controller may use the data that it receives from peripherals and/or network-connected devices to determine the illumination target. The controller may then adjust the final optical element to illuminate the determined illumination target. Example peripherals include, but are not limited to, sensors including motion sensors, cameras, and thermostats. Example network-connected devices include mobile devices, laptops, smart home automation systems, and smart thermostats.

In an example embodiment illustrated in FIG. 2B, non-stationary illumination source 232 may be the sun, primary optical element 234 may be a heliostat comprising a circular mirror, secondary optical element 236 may be a planar mirror mounted attached to building 240, and final optical element 252 may be a mirror. In an example, system 230 may illuminate room 246 in a way that mimics the illumination of sun 232 throughout the day. Specifically, the controller may receive data from a server indicating the position of the sun throughout the day. The controller then continually adjusts mirror 252 to reflect light in a manner that mimics the illumination of sun 232 throughout the day. As such different amounts of light may be reflected into different sections of room 246 throughout the day.

In another example embodiment, the controller may receive data from a motion sensor indicating that a user has entered room 246. The controller of system 230 may then adjust final optical element 252, which may be a mirror, to reflect light to illuminate the entire room. In other examples, final optical 252 may be a concentrator configured to focus light into a specific target area. In an example, the controller may use sensors installed in room 246 to detect the movement of a user in room 246. As such, the controller may adjust concentrator 252 to redirect a focused beam of light to follow the user around the room. In other examples, the controller may determine the manner of illuminating room 246, depending on the number of people in the room. For example, the controller may receive data from sensors in room 246 indicating the number of people in the room. The controller may also receive data from sensors in room 246 indicating the location of people in the room. Consequently, if a number of people occupy the room, the controller may adjust final optical element 252 to illuminate the entire room, rather than a portion of it, as it may do when a single person is occupying the room.

In yet other examples, light emanating from non-stationary illumination source 232 may be obstructed from reaching primary optical element 234. For example, on a cloudy day, sunlight may be obstructed from reaching heliostat 234. As such, the controller of system 230 may receive data indicating that light is obstructed from reaching heliostat 234. The controller may then adjust heliostat 234 to redirect light emanating from a stationary illumination source (not shown). For instance, system 230 may redirect light to room 246 from a high intensity LED on days when it is cloudy and sunlight is obstructed from reaching heliostat 234. In yet other example embodiments, system 230 may be configured to redirect light to room 246 during emergency situations. For example, during a severe storm, there may be a power outage, and as a result room 246 will go dark. In these situations, system 230 may be configured to redirect light from a stationary illumination source, which may be battery powered or connected to a generator, to room 246. Other example embodiments are possible.

Figure 3:
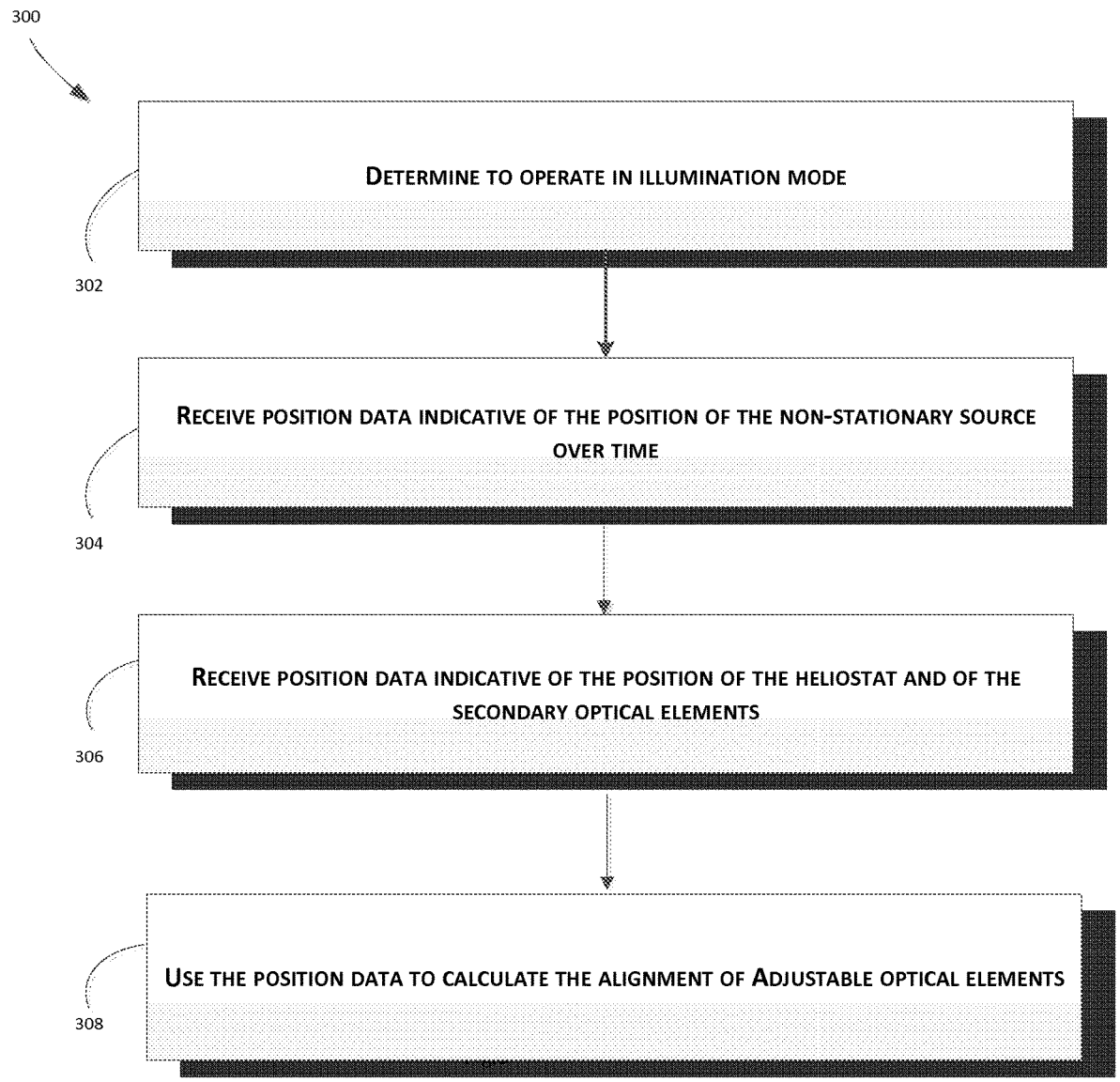
FIG. 3 is a simplified block diagram illustrating a method of determining the mode of operation of a system, according to an exemplary embodiment.

FIG. 3 is a flowchart illustrating a method 300, according to an example embodiment. Method 300 may be implemented by a kinematically linked system in order to redirect light from a non-stationary illumination source to an illumination target. Illustrative methods, such as method 300, may be implemented by kinematically linked systems, such as the systems described in reference to FIG. 1, and/or by the controller of such systems.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 3. Where used, program code can be stored on any type of computer-readable medium, for example, such as a storage device including a disk or hard drive.

In addition, each block of the flowchart shown in FIG. 3 may represent circuitry that is wired to perform the specific logical functions in the process. Unless specifically indicated, functions in the flowchart shown in FIG. 3 may be executed out of order from that shown or discussed, including substantially concurrent execution of separately described functions, or even in reverse order in some examples, depending on the functionality involved, so long as the overall functionality of the described method is maintained.

As shown by block 302 of FIG. 3, method 300 may include an exemplary light redirection system making a determination to operate in illumination mode. The system may make the determination in response to a user input directing the system to operate in illumination mode. The determination to operate in illumination mode may also be made intelligently by the controller of the system. The controller of the system may use data it receives in making the determination to operate in illumination mode. For example, a system may be configured to redirect light into a room when a user may be in it. As such, the controller of the system may receive data indicating the presence of a user in the room from a motion sensor. The controller may then intelligently make a determination to operate in illumination mode. In another example, the system may be preconfigured to operate in illumination mode during certain times of the day set by the user of the system.

After making the determination to operate in illumination mode, the system may receive position data indicative of the position of the non-stationary source over time, as explained in block 304. For example, the non-stationary source may be the sun. Consequently, the controller may receive data, from a network-connected server for instance, that details the position of the sun throughout that day.

As shown by block 306, the system may further receive data indicative of the location of the heliostat and of the secondary optical elements. For example, the data may include the GPS coordinates of the heliostat and of the secondary optical elements. In other examples, the data may include an identifier of whether an optical element is located indoors or outdoors.

Finally, as shown by block 308, the system may use the position data of the non-stationary source and of the optical elements to calculate the alignment of adjustable optical elements. Examples of adjustable optical elements of the system may include a heliostat of the system and the final optical element of the system. In an example embodiment, the system may calculate the alignment of the optical elements that may reflect the most amount of light possible to an illumination target of the system. In other examples, the system may calculate the alignment such that the system may reflect only a certain amount of light. For example, a user of the system may request the illumination of the target not to exceed a certain amount. Thus, the system may use the position data to calculate the orientation of the optical elements in order to stay below the threshold set by the user. In other embodiments, the user may request the light to illuminate a specific area. As such, the system may calculate the orientation of optical elements in order to illuminate the area defined by the user.

B. Energy Generation Mode

In an exemplary mode of operation, a light redirection system may be configured to redirect light to an illumination target for energy generation purposes. In example embodiments, a light redirection system may redirect sunlight to a solar cell to generate energy. The solar cells may be part of one of many different power grids or circuits. For example, the solar cells may be connected to a local micro-grid installed in the same building or structure that the light redirection system is installed in the proximity of A micro-grid may function both as part of the main energy grid and as an isolated grid unique to the building that it may be connected to. The micro-grid may also be unique to a user within a building. As such, in example embodiments, the light redirection system may meet all the energy demands of a user by redirecting light onto solar cells part of a micro-grid unique to the user. In other examples, if the energy demands of user are high, a light redirection system may supplement the energy supplied from the main grid to the user. In yet other examples, a light redirection system may charge a storage cell of the micro-grid by redirecting light to a solar cell that may be connected to the micro-grid. The storage cell may be a battery, a supercapacitor, a fuel cell, or any other energy storage cell. The storage cell may be used to supplement power from the main grid in periods of high energy demand, and may also be used in emergency situations.

In other embodiments, a light redirection system may help transfer power into the main grid by redirecting light to solar cells that may supply power to the main grid. In embodiments, the solar cells may supply power to the main grid via a micro-grid's connection to the main grid. In other embodiments, the solar cells may be directly connected to the main grid. As such, the solar cells may "put back" power into the grid by generating power that is supplied to the main grid when light is redirected onto the solar cells. In embodiments where power may be supplied to the main grid, the user may receive compensation from the utility operating the main grid. For example, a user that supplies power to the main grid may receive credits on their utility bill. In other examples, a user may sell the energy to the utility at the energy market price at that time.

In yet other embodiments, a user may configure a light redirection system to be used by a different user, a neighbor for example, for energy generation. For example, a neighbor of a user may request light to be redirected onto one or more solar cells that may be connected to a micro-grid operated by the neighbor. The neighbor may request light to be redirected from a user's system for other purposes as well.

Many factors may affect a system making a determination to operate in energy generation mode. For example, a user may direct the system, via a mobile device for instance, to operate in energy generation mode. In other embodiments, a system may intelligently make the determination to operate in energy generation mode. For example, a system may use the data that it receives from peripherals and/or network connected devices to make a determination to operate in energy generation mode. For instance, the system may receive data from a motion sensor indicating that a room, to which the system was redirecting light to, is empty. The system may then redirect the light to one or more solar cells to generate energy. In other examples, the system may receive data from other peripherals such as a smart thermostat system. The data that the system receives from the smart thermostat may be indicative of the current temperature of the room to which the system may be redirecting light to. If the temperature exceeds a certain threshold, the system may make the determination to operate in energy generation mode.

Due to the many factors that may affect a system making a determination to operate in generation mode, a system may make decisions in accordance with exemplary algorithms that may be represented by decision trees. An exemplary decision tree may depend on a user's predefined preferences, which a user may define via a mobile device, for instance. In an example, the user may set the temperature of the room at which the system switches from illumination mode to energy generation mode. In other examples, the user may set preferences according to several if statements. For instance, the user's preference may be to operate in energy generation mode if the room into which a system is redirecting light is empty and if the temperature exceeds a certain threshold.

Figure 4:
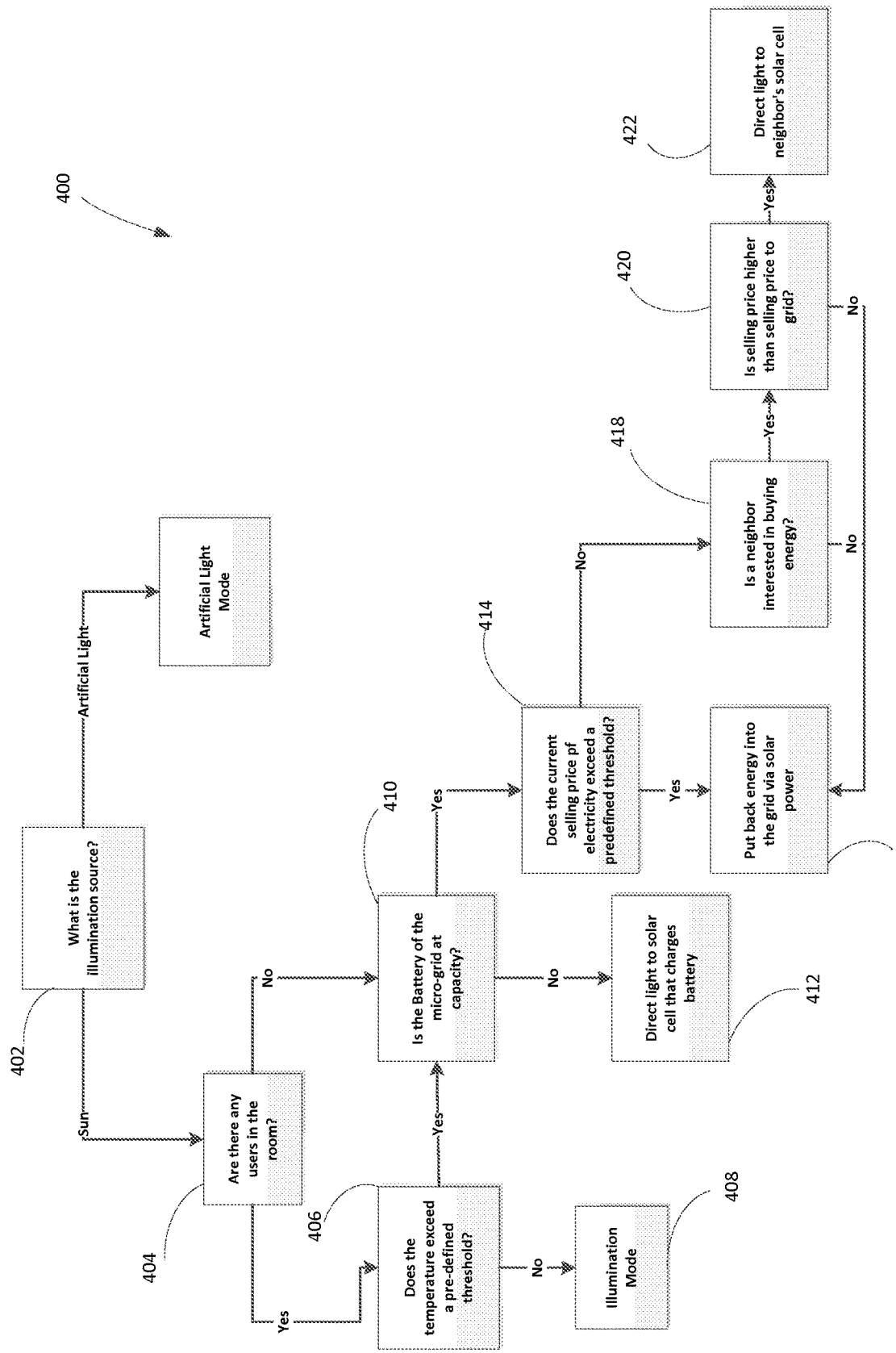
FIGS. 4 and 5 illustrate decision trees that an intelligent system may follow, according to exemplary embodiments.

FIG. 4 illustrates an example decision tree, which an exemplary light redirection system may follow. Specifically, in block 402, the system may determine what the illumination source is. If the illumination source is an artificial light, the system may operate in an artificial mode. Example embodiments of artificial light mode will be explained in the next section. If the illumination source is the sun, the system moves to decision block 404, which determines whether there are any users in the room to which the system may be redirecting light to. If there are users in the room, the system may move to decision block 406 which may determine whether the temperature exceeds a predefined threshold. If the temperature does not exceed a certain temperature, the system may move to block 408 to operate in illumination mode. If the temperature exceeds the predefined threshold, the system moves to block 410, which may determine whether the battery of the user's micro-grid is at capacity. If the battery is not at capacity, the system moves to block 412 which may direct light to one or more solar cells that may charge the battery. The battery of the micro-grid may be used to supply power to a user when the user has high demand. The battery may also supply power to the user when there is a power outage from the main grid. Other uses of the battery are also possible.

If the battery of the user's micro-grid is at capacity, the system may move to decision block 414, which may determine whether the current selling price of electricity in energy markets exceeds a certain price, which may be predefined by the user. If the current selling price of electricity exceeds a certain price, the system may move to block 416, which may sell the energy generated by one or more solar cells to a utility at market price. The power generated may be transmitted to the main grid directly or via the user's micro-grid. If the current selling price of electricity does not exceed a certain price, the system may move to block 418, which may determine whether a neighbor is interested in buying energy from a user. For example, the system may send a text message to the neighbor asking whether the neighbor would like to buy power from the user at a certain price. If the neighbor is not interested in buying energy from the user, the system may move to block 416, which may sell the energy generated by one or more solar cells to a utility below the price set by the user. The power generated may be transmitted to the main grid directly or via the user's micro-grid. If the neighbor is interested in buying energy, the system may move to block 420, which may determine whether the selling price to the neighbor is higher than the market price at which the utility may be buying power at. If the price is not higher, the system may move to block 416, which may sell the energy generated by one or more cells to the utility at the market price. However, if the selling price to the neighbor is higher, the system may move to block 422, which may redirect the light for the neighbor's use.

Figure 5:
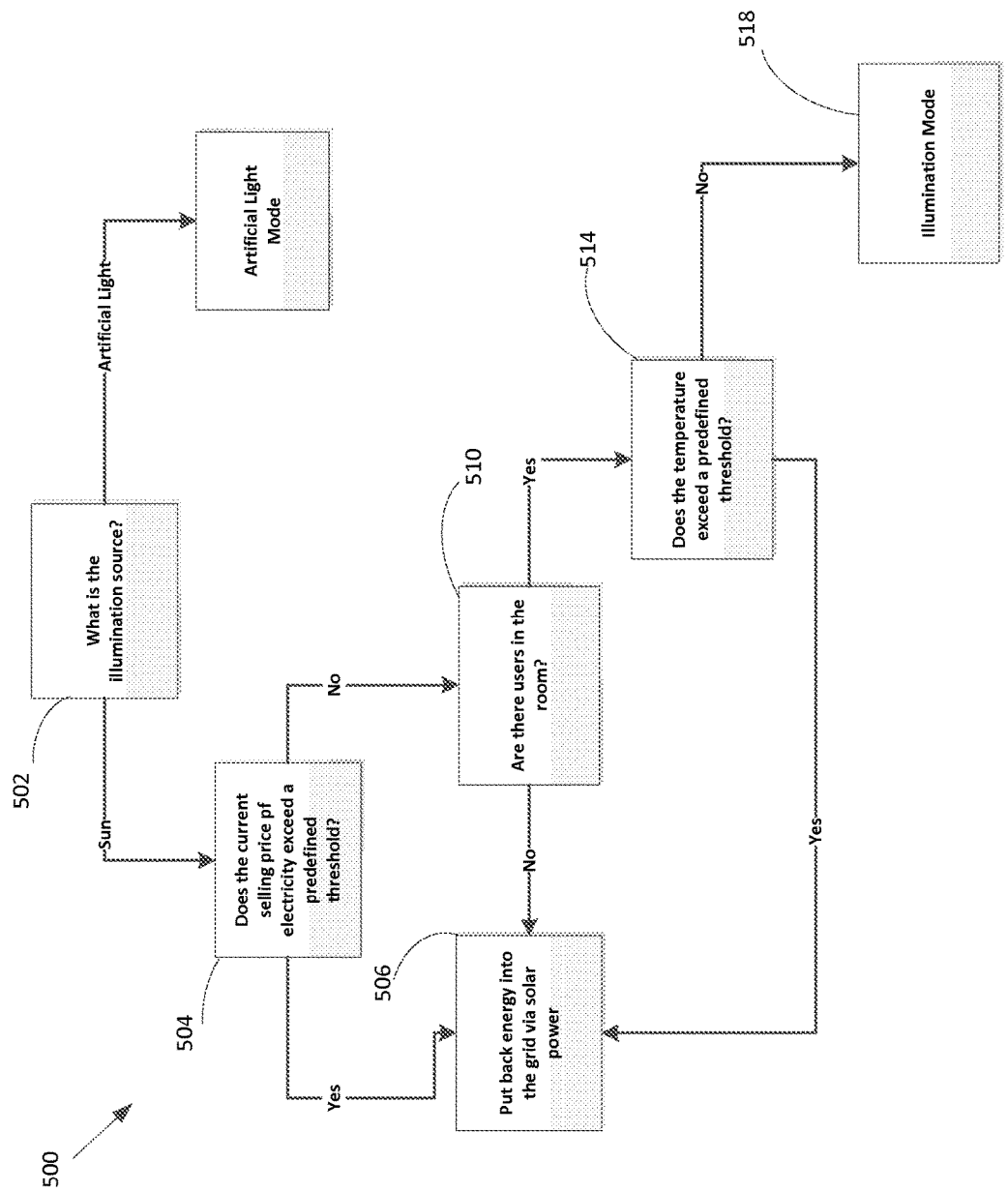

The order of the blocks of FIG. 4 may depend on a user's preference. For example, a user may choose to sell energy to the utility even if there are users in the room, as the user may sell more power than the power consumed by the user. Thus, the user may be able to make a profit by selling power to the utility. In other examples, the system may query the user in real time to make a decision regarding the mode of operation. For example, the system may inform a user of the current market price of energy. The system may also inform the user whether it is economically advantageous to switch from one to another, and may query the user for an input directing the system. Another example of a decision tree that a light redirection system may use is illustrated in FIG. 5.

The above exemplary decision trees for determining the mode of operation for a light redirection system are provided for illustrative purposes and are not intended to be limiting. It should be understood that other decision trees and/or algorithms may be used to determine the mode of operation for a light redirection system.

C. Artificial Light Mode

In an exemplary mode of operation, a kinematically linked system may be configured to redirect artificial light to an illumination target. In an example embodiment, a light redirection system may be configured to redirect artificial light from a stationary source in a manner that may simulate the illumination of sunlight. For example, a system may be configured to simulate the illumination of sunlight by redirecting light from a high-intensity LED to an illumination target during times when sunlight may be blocked from illuminating the illumination target. In other examples, a system may be configured to simulate the illumination of sunlight by redirecting artificial light from a stationary source during nighttime.

In an example embodiment, a light redirection system may be configured to redirect artificial light to an illumination target during an emergency situation. For example, if there is a power outage, the light redirection system may be configured to redirect light from an artificial source, which may be battery powered for instance, to an illumination target. As such, the illumination target may be illuminated during an emergency situation. In example embodiments, the light redirection system may be configured to redirect light to a safe area in a building, so that the building's residents may be able to reach the safe area during an emergency.

Figure 6:
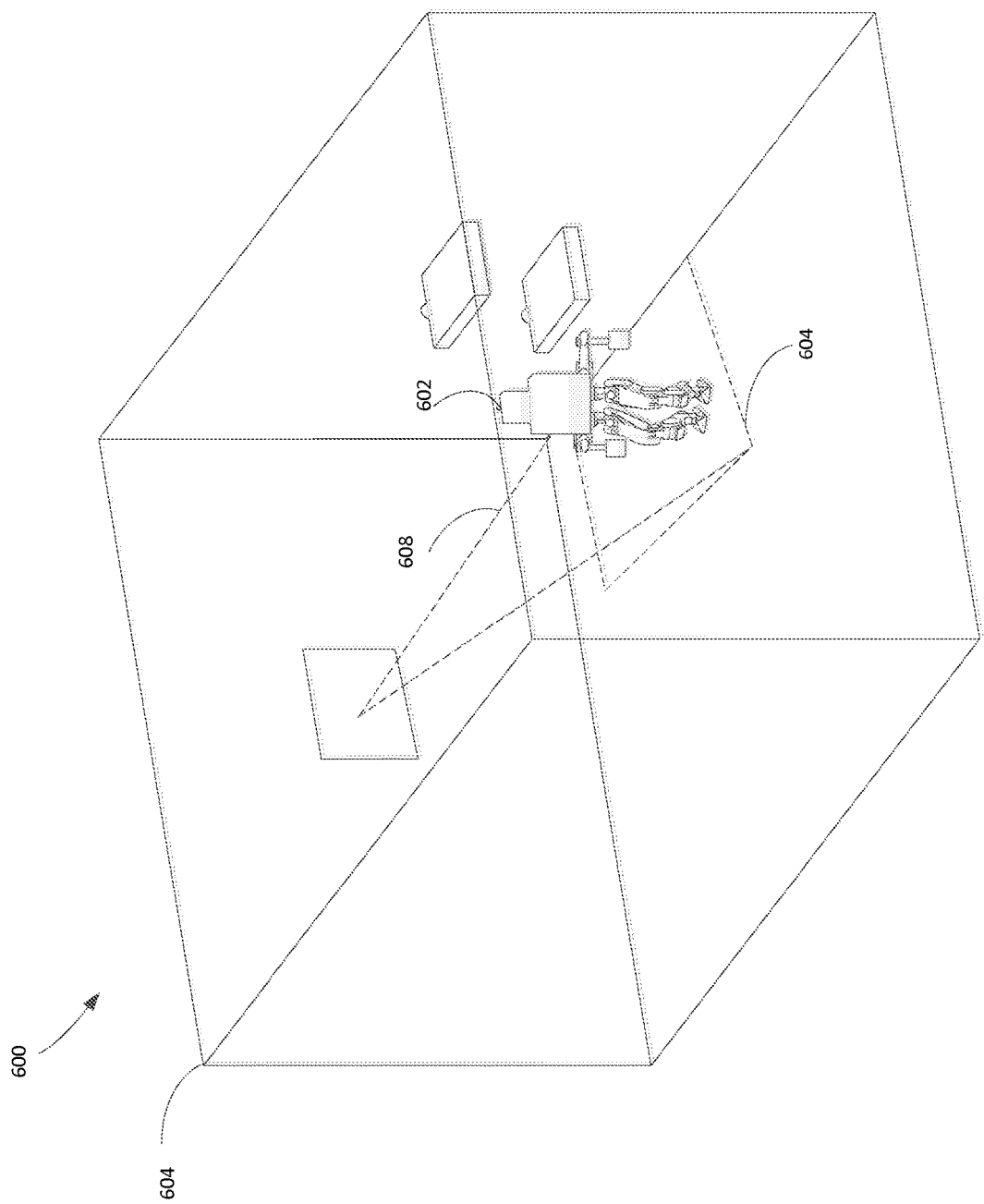
FIG. 6 illustrates a system in artificial light mode, according to exemplary embodiments.

FIG. 6 illustrates an artificial light redirection system 600, according to exemplary embodiments. In exemplary embodiments, an artificial light redirection system may be configured to track the movement of a robotic device within a building, and configured to illuminate the area in the proximity of the robotic device. A robotic device may need illumination for various sensors and cameras that robotic device may use to operate. Accordingly, an artificial light redirection system may continually redirect light to illuminate the area in proximity of the robotic device as the device moves. Specifically, a controller may be configured to receive position data indicative of movement of the illumination target, and based at least in part on the position data, move at least the last optical element to continuously re-direct the beam of light to the moveable illumination target during a movement of the moveable illumination target.

As can be seen in FIG. 6, robotic device 602 may be operating in room 604. Specifically, robotic device 602 may be located in region 606. Region 606 may be a fixed dimension region around robotic device 602, and as such may move as robotic device 602 moves. Further, light redirection system 600 may redirect beam of light 608 from an artificial illumination source (not shown) via optical elements to the last optical element of system 600 (not shown), which may be moveable. The last optical element may be configured to continuously redirect beam of light 608 to illuminate region 606. Consequently, robotic device may successfully operate in region 606 using sensors that may need illumination to function.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting.

Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A system comprising:
   a plurality of optical elements installed in a proximity of a building, the plurality of optical elements comprising at least a first optical element and one or more secondary optical elements;
   a heliostat operable to move the first optical element to reflect light from a non-stationary light source towards the one or more secondary optical elements;
   a renewable energy cell installed in the proximity of the building;
   a plurality of different types of sensors installed in a room of the building; and
   a computer apparatus having one or more processors and memory storing instructions that, when executed by the one or more processors, cause the system to carry out operations including:
   receiving instructions indicating to redirect the light towards the renewable energy cell when one or more combinations of a plurality of predefined thresholds corresponding to the plurality of different types of sensors are met;
   receiving, from the plurality of different types of sensors, sensor data indicative of a current status of the room;
   determining that the sensor data meets at least one of the one or more combinations of the plurality of predefined thresholds; and
   based on determining that the sensor data meets the at least one of the one or more combinations of the plurality of predefined thresholds, repositioning one or more of the plurality of optical elements to redirect the light towards the renewable energy cell.

2. The system of claim 1, wherein the plurality of different types of sensors comprises a sensor configured to generate sensor data indicative of occupancy of the room, and wherein the current status of the room is indicative of a number of individuals located in the room.

3. The system of claim 2, wherein the plurality of predefined thresholds comprises a predetermined threshold number of individuals, and wherein the one or more combinations comprise the number of individuals located in the room being less than the predetermined threshold number of individuals.

4. The system of claim 1, wherein the plurality of different types of sensors comprises a sensor configured to generate sensor data indicative of a temperature of the room, and wherein the current status of the room is indicative of a temperature of the room.

5. The system of claim 4, wherein the plurality of predefined thresholds comprises a predetermined threshold temperature, and wherein the one or more combinations comprise the temperature of the room being greater than the predetermined threshold temperature.

6. The system of claim 1, wherein the renewable energy cell comprises a battery, and wherein redirecting the light towards the renewable energy cell causes the renewable energy cell to charge the battery.

7. The system of claim 6, wherein the operations further include:
   determining that a charge level of the battery has exceeded a predetermined threshold.

8. The system of claim 7, wherein the operations further include:
   determining that an electrical selling price to an electric grid exceeds a predetermined threshold, wherein the system is coupled to the electric grid; and
   in response, determining to provide energy to the electric grid.

9. The system of claim 7, wherein the operations further include:
   determining that an individual living within a threshold distance of the room is interested in purchasing energy from the system.

10. The system of claim 9, wherein the operations further include:
    determining that an energy selling price to the individual is greater than a selling price to an electric grid; and
    in response, determining to redirect the light towards a second renewable energy cell associated with the individual.

11. The system of claim 9, wherein the operations further include:
    determining that an electrical energy selling price to the individual is less than or equal to an electrical energy selling price to an electric grid, wherein the system is coupled to the electric grid; and
    in response, determining to provide energy from the renewable energy cell to the electric grid.

12. The system of claim 1, wherein the non-stationary light source is a natural light source.

13. The system of claim 1, wherein at least one of the one or more secondary optical elements is a mirror.

14. A method comprising:
    receiving, at a light redirection system, instructions indicating to redirect light towards a renewable energy cell when one or more combinations of a plurality of predefined thresholds corresponding to a plurality of different types of sensors are met;
    receiving, at the light redirection system and from the plurality of different types of sensors, sensor data indicative of a current status of a room of a building, wherein the plurality of different types of sensors is installed in the room, and wherein the light redirection system comprises: (i) a plurality of optical elements installed in a proximity of the building, the plurality of optical elements comprising at least a first optical element and one or more secondary optical elements, and (ii) a heliostat operable to move the first optical element to reflect light from a non-stationary light source towards the one or more secondary optical elements;
    determining that the sensor data meets at least one of the one or more combinations of the plurality of predefined thresholds; and
    based on determining that the sensor data meets the at least one of the one or more combination of the plurality of predefined thresholds, repositioning one or more of the plurality of optical elements to redirect the light towards the renewable energy cell, wherein the renewable energy cell is installed in the proximity of the building.

15. The method of claim 14, wherein the renewable energy cell comprises a battery, and wherein redirecting the light towards the renewable energy cell causes the renewable energy cell to charge the battery.

16. The method of claim 15, further comprising:
    determining that a charge level of the battery has exceeded a predetermined threshold.

17. The method of claim 16, further comprising:

determining that an electrical energy selling price to an electric grid exceeds a predetermined threshold, wherein the light redirection system is coupled to the electric grid; and in response, determining to provide electrical energy to the electric grid.

18. The method of claim 16, further comprising:

determining that an individual living within a threshold distance of the room is interested in purchasing energy from the light redirection system.

19. The method of claim 18, further comprising:

determining that an electrical energy selling price to the individual is greater than an electrical energy selling price to an electric grid; and in response, determining to redirect the light towards a second renewable energy cell associated with the individual.

20. A non-transitory computer-readable medium having stored thereon program instructions that, when executed by a computing device associated with a light redirection system, cause the computing device to perform operations comprising:

receiving instructions indicating to redirect light towards a renewable energy cell when one or more combinations of a plurality of predefined thresholds corresponding to a plurality of different types of sensors are met;

receiving, from the plurality of different types of sensors, sensor data indicative of a current status of a room of a building, wherein the plurality of different types of sensors is installed in the room, and wherein the light redirection system comprises: (i) a plurality of optical elements installed in a proximity of the building, the plurality of optical elements comprising at least a first optical element and one or more secondary optical elements, and (ii) a heliostat operable to move the first optical element to reflect light from a non-stationary light source towards the one or more secondary optical elements;

determining that the sensor data meets at least one of the one or more combinations of the plurality of predefined thresholds; and based on determining that the sensor data meets the at least one of the one or more combination of the plurality of predefined thresholds, repositioning one or more of the plurality of optical elements to redirect the light towards the renewable energy cell, wherein the renewable energy cell is installed in the proximity of the building.

\* \* \* \* \*